(No Model.)
R. PEARSON.
THERMOMETRIC CIRCUIT CLOSER.
No. 546,551. Patented Sept. 17, 1895.
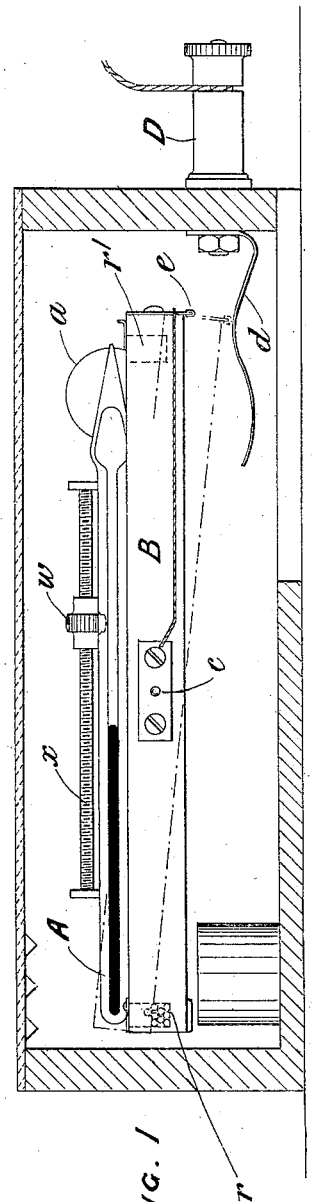
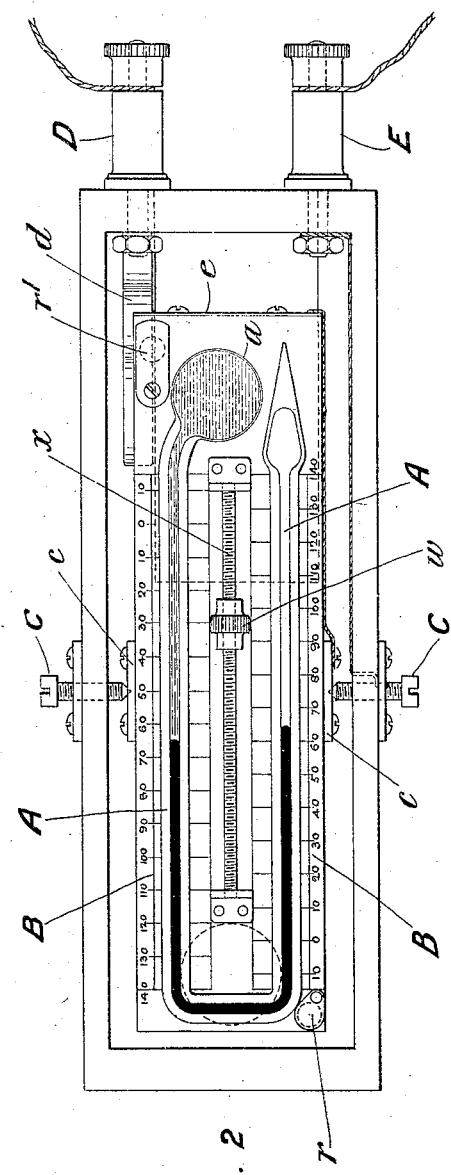
FIG. 1.
FIG. 2.
WITNESSES.
C. Sedgwick
INVENTOR:
R. Pearson
BY Munn & Co.
ATTORNEYS
ANDREW B. GRAHAM, PHOTO-LITHO. WASHINGTON, D.C.

UNITED STATES PATENT OFFICE.

RICHARD PEARSON, OF LONDON, ENGLAND.

THERMOMETRIC CIRCUIT-CLOSER.

SPECIFICATION forming part of Letters Patent No. 546,551, dated September 17, 1895.

Application filed May 2, 1895. Serial No. 547,945. (No model.)

*To all whom it may concern:*

Be it known that I, RICHARD PEARSON, mining engineer, of 154 Gresham House, Old Broad Street, London, E. C., England, have invented new and useful Thermometric Circuit-Closers, of which the following is a full, clear, and exact description.

My invention relates to a thermometric electric circuit-closing device; and it consists of a thermometer mounted on a horizontal axis and so balanced as to be caused to oscillate under the displacement of the center of gravity by the expansion and contraction of the thermometric fluid, and by such oscillation to automatically complete or break an electric circuit used for any purpose, such as for sounding an alarm of fire, actuating a water-sprinkler, or for merely indicating by an audible or other signal the attainment of a predetermined limit of temperature. The thermometer used is of the kind in which mercury is used, not as the thermometric agent, but only to indicate the expansion and contraction of a lighter fluid, such as an acid or alcohol, under variations of temperature, the form of thermometer adopted being that known as a "maximum" and "minimum" thermometer, the bore of the tube being, however, of considerably greater diameter than usual, in order that the volume and weight of the mercury contained may be sufficient for the purpose. This kind of thermometer is especially suited for the purpose I have in view, not by reason of the twofold indications which it affords, but because the motion of the mercury column under expansion and contraction of the motive fluid has the effect of shortening the length of the mercurial column in one leg and of lengthening it to a corresponding extent in the other, the two variations conducing toward the same mechanical result, so that the balance is disturbed twice as powerfully as would be the case by an equal variation of the length of the column in one leg alone. Moreover, this kind of thermometer admits of the use of a mercurial column of relatively large section without the large bulb, which would be required for an ordinary thermometer, wherein the mercury itself is the thermometric fluid, and I am thus enabled to obtain sufficient motive force to overcome friction and insure efficient action and perfect electrical contact within a small compass and with short leverage.

The invention is illustrated in the accompanying drawings, forming part of this specification, wherein—

Figure 1 is a side elevation and Fig. 2 a plan of the thermometric portion of the alarm.

The same letters of reference denote like parts in both figures.

A is an ordinary maximum and minimum thermometer fixed on a wooden scale B and mounted to oscillate on a pair of horizontal pivots C.

D E are binding-posts for connection of the wires, in the circuit of which is the battery and the alarm or other device to be operated by the passage of the current. The post D is connected with a spring-contact $d$, placed beneath the bulb end of the thermometer, and the post E is connected with one or both the centers C, which are of brass, and are in electrical contact with the pivot. Bearing-plates $c$, which rest on them and are connected by a wire with a contact-lip $e$, fixed to the end of the scale B and projecting down in position to come down upon the spring-contact $d$ when the equipoise of the instrument is disturbed by a rise of temperature, and so complete the electrical circuit. The instrument is mounted on its centers, so as at the normal temperature of an apartment, to be in a condition of or approaching stable equilibrium, the length of the mercurial column in both legs extending to about the axis of oscillation or nearly so. Thus arranged, a very slight increase of temperature will cause the fluid in the bulb $a$ to expand and drive the mercury down the one leg and up the other, the shortening of the mercury column in the "minimum" leg lightening the instrument at one side of the axis at the same time as the lengthening of the column in the "maximum" leg beyond the axis increases the weight at the opposite side of the center of oscillation and causes the bulb end to quickly and powerfully preponderate, so as to bring the instrument to the position shown in dotted lines and close the circuit at $c\ d$. Should a fall of temperature then occur, the motion of the mercury in the opposite direction will cause the instrument to resume its original position and break the circuit. The action will be similar when, by a fall of temperature much below the normal, the mercury column in the minimum leg extends past the axis of oscillation, while that in the other leg recedes from the axis, so that the instrument may be used in greenhouses and other places where the temperature is required to be kept within certain limits of heat and cold.

In order that the balance of the instrument may be readily adjusted so as that it will oscillate at any given temperature, receptacles $r\,r'$, covered by pivoted shutters, are provided in the scale for small shot or other convenient form of removable weight, by means of which a rough adjustment suitable for general purposes may be obtained, while a means of finer adjustment, such as a requisite for sick-wards, is provided in the form of a jockeyweight $w$, fitted to slide along the scale and adjusted directly or by means of a traversing-screw $x$.

In order to avoid breaking of the mercurial column by a sudden oscillation, which breakage is liable to occur by reason of the comparatively large bore of the tube, I prefer to employ a thermometric fluid of higher specific gravity than alcohol. For this purpose I find that dilute sulphuric acid of a specific gravity of 1.222 is suitable.

I would observe that I am aware that it has heretofore been proposed to balance an ordinary mercurial thermometer for similar purposes, but without practical result. I do not, therefore, claim the adaptation of any but the kind of thermometer herein specified—viz., one in which mercury serves only to render visible the expansion and contraction of a lighter fluid and also as the means of producing the oscillation of the instrument.

I claim—

1. A thermometric circuit closing device, consisting of a balanced thermometer mounted to oscillate on a horizontal axis and containing a thermometric fluid other than mercury and also a mercurial column movable along the bore by the expansion of such fluid under heat, this motion of the mercurial column having for effect to both increase the weight at one side of the axis and at same time decrease it at the other side of the axis, substantially as specified.

2. A thermometric circuit closing device, comprising a U-shaped maximum and minimum thermometer mounted to oscillate on a transverse horizontal axis, and containing a thermometric fluid other than mercury, the tube containing a mercurial column movable under the expansion of the thermometric fluid in such manner that the length of the column of mercury at the one side of the axis of oscillation will be diminished concurrently with the increase in the length of the column at the other side of the axis, and thereby cause the bulb end to preponderate and a circuit to be closed, substantially as specified.

RICHARD PEARSON.

In presence of—
T. W. KENNARD,
C. G. CLARK.